United States Patent [19]

Lorenzo et al.

[11] 4,328,423

[45] May 4, 1982

[54] CANISTER ARRANGEMENT FOR STORING RADIOACTIVE WASTE

[75] Inventors: Donald K. Lorenzo, Knoxville; John E. Van Cleve, Jr., Kingston, both of Tenn.

[73] Assignee: The United States of America as represented by the United States Department of Energy, Washington, D.C.

[21] Appl. No.: 143,060

[22] Filed: Apr. 23, 1980

[51] Int. Cl.[3] .................... C09K 3/00; C09K 11/04; G21F 5/00

[52] U.S. Cl. .................... 250/506; 252/628; 252/633

[58] Field of Search .................... 252/628, 629, 633; 250/506

[56] References Cited

U.S. PATENT DOCUMENTS

| | | | |
|---|---|---|---|
| 2,918,717 | 12/1959 | Struxness et al. | 250/506 |
| 3,229,096 | 1/1966 | Bonilla et al. | |
| 3,365,578 | 1/1968 | Grover et al. | 250/506 |
| 3,669,299 | 6/1972 | Jones et al. | 220/10 |
| 3,780,309 | 12/1973 | Bochard | 250/507 |
| 3,930,166 | 12/1975 | Bochard | 250/506 |
| 3,935,467 | 1/1976 | Gablin | 250/507 |
| 3,983,050 | 9/1976 | Mecham | 252/301.1 W |
| 4,009,990 | 3/1976 | Bonniaud et al. | 432/13 |
| 4,021,676 | 5/1977 | Duffy | 250/506 |
| 4,058,479 | 11/1977 | White | 252/628 |
| 4,115,311 | 9/1978 | Sump | 252/301.1 W |
| 4,131,563 | 12/1978 | Bahr et al. | 252/628 |
| 4,143,277 | 3/1979 | Krieger | 250/507 |
| 4,168,243 | 9/1979 | Gablin | 252/301.1 W |
| 4,222,889 | 9/1980 | Uerpmann | 252/628 |

*Primary Examiner*—Harold A. Dixon
*Attorney, Agent, or Firm*—Earl L. Larcher; Stephen D. Hamel; Richard G. Besha

[57] ABSTRACT

The subject invention relates to a canister arrangement for jointly storing high level radioactive chemical waste and metallic waste resulting from the reprocessing of nuclear reactor fuel elements. A cylindrical steel canister is provided with an elongated centrally disposed billet of the metallic waste and the chemical waste in vitreous form is disposed in the annulus surrounding the billet.

5 Claims, 4 Drawing Figures

CANISTER ARRANGEMENT FOR STORING RADIOACTIVE WASTE

This invention was made as a result of a contract with the U.S. Department of Energy.

BACKGROUND OF THE INVENTION

The present invention relates generally to the storage of radioactive chemical waste and metallic waste, and more particularly to an improved canister arrangement for jointly storing such waste.

The reprocessing of nuclear reactor fuel elements results in the formation of considerable quantities of high-level, long half-life radioactive waste in both chemical and metallic form. It is necessary to store this waste in such a manner that the radioactive material is prevented from contaminating the environment. The chemical waste has been previously encased in a vitreous matrix which is inert and exhibits relatively low solubility so as to contain the chemical waste in an environmentally safe manner. The glassified waste is usually cast in sealable steel canisters. The metallic waste on the other hand has been cast into a billet or solid cylinder form and encased in a suitable canister.

The storage of the chemical and metallic radioactive waste by techniques as described above does have some shortcomings. For example, while the glass matrix provides an excellent containment for high level chemical waste it possesses relatively low thermal conductivity values which do not allow for adequate dissipation of heat from the glass so as to yield deleteriously high temperature levels along the center line of the glass. Efforts to overcome such heating problems associated with the storage of radioactive material in glass include the incorporation of a heat-exchanging fin arrangement in the glass as described in assignee's U.S. Pat. No. 4,021,676 issued May 3, 1977. This fin arrangement provides an arrangement wherein center line hot spots in the glass cylinder are essentially eliminated.

Radioactive metallic waste is planned to be stored as a compact or as a billet in a canister separate from the glass-containing canister. The metallic waste storage poses some problems due to the canister volume and the material density. The metallic waste may be densified to near the theoretical density by melting the radioactive metallic waste into the form of a solid cylinder. However, unless such a solid cylinder can be produced of virtually the same diameter as the enveloping waste canister, the considerable advantages of casting billets to near theoretical density over compaction of the waste metal in the canister is substantially minimized. Further, hot cells capable of producing relatively long and large diameter cylinders of metallic waste are not presently available.

With high-level radioactive waste, strict administrative limits are set in such areas as canister size, maximum surface temperature, maximum glass temperature, maximum chemical waste (calcine) to glass frit composition ratio by weight, and maximum total canister heat content at the time of shipment.

SUMMARY OF THE INVENTION

It is the primary aim or goal of the present invention to provide a storage canister arrangement wherein the high level radioactive chemical waste may be stored in glass form together with the radioactive metallic waste in the form of a centrally disposed solid cylinder. This joint storage of the chemical and metallic waste provides an advantageous arrangement in that the centrally disposed cylinder of metallic waste provides a considerable improvement in heat transfer from the encompassing glass so as to effectively eliminate the center line hot spots heretofore encountered. Further, since the billet of metallic waste is cast to a size which may be easily positioned within the metal canister and since the glass containing the chemical waste is disposed in the annulus between the metal billet and inside walls of the canister, the utilization of the volume within the canister is optimized for the storage of the radioactive waste. The joint storage of the chemical and metallic waste provides a considerable improvement in the economics in the storage of radioactive waste and also effectively eliminates the individual storage requirements of the chemical waste and the metallic waste as heretofore employed.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

DETAILED DESCRIPTION OF THE INVENTION

Figure 1:
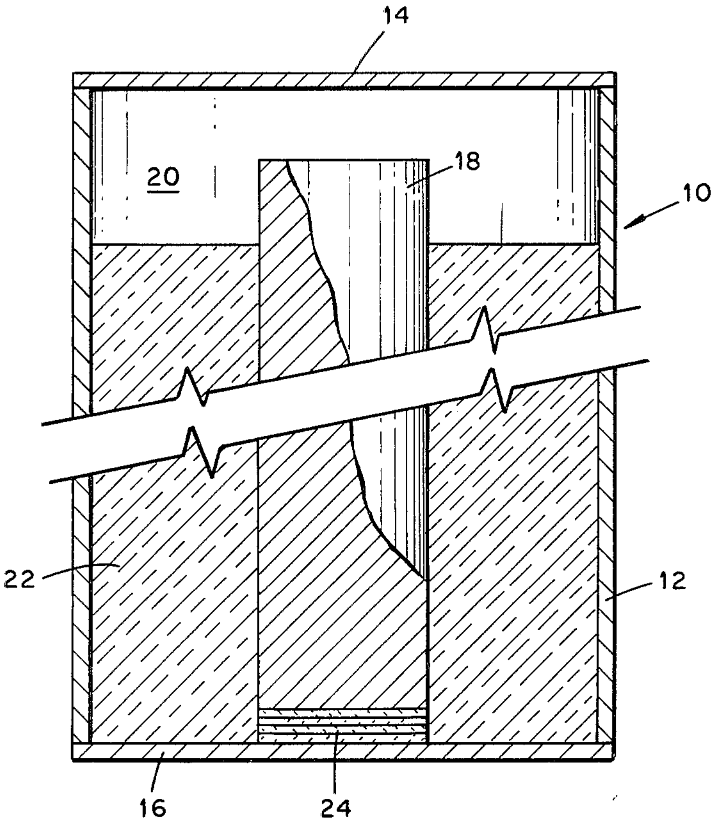
FIG. 1 is a sectioned elevational view illustrating the storage canister arrangement of the present invention as utilized for the combined storage of chemical and metallic radioactive waste.

As shown in FIG. 1 of the accompanying drawings, the present invention is a canister arrangement generally shown at 10 for storing high level (heat-producing) radioactive chemical waste and activated or transuranic-contaminated metallic waste. The canister comprises an elongate cylindrical shell or casing 12 with closure means or end caps 14 and 16 at the top and bottom of the shell 12 for closing the canister in an air-tight manner. Within the shell 12 is a centrally disposed solid elongate cylindrical billet 18 of radioactive waste metal. This billet 18 is disposed in a coaxial relationship with the longitudinal axis of the shell 12 and is vertically separated from the end caps 14 and 16. The waste metal billet 18 is also radially spaced from the shell 12 to define an annulus 20 therebetween. This annulus 20 is, in turn, provided with vitrified chemical waste 22 disposed in a contacting relationship with both the billet 18 and the shell 12 and extends longitudinally along the billet 18 a desired distance.

The solid metal billet 18 is shown separated from the bottom end cap 16 by a thermal insulating wafer of refractory ceramic as generally shown at 24 so as to eliminate hot spots on the canister bottom. However, if desired, the billet 18 may be supported in the shell 12 at a location spaced from the bottom end cap 16 by a lift or hoist (not shown) prior to melting the glass so that the glass 22 will flow beneath the billet 18 and form the desired insulator upon cooling.

The chemical waste contains over about 99% of the fission products and generates significantly more heat than the metallic waste. The glass formulation utilized to form the matrix for this thermally hot, high-level chemical waste is dependent upon several factors but can vary over fairly broad compositional ranges. The selection of the glass-forming additives or frit is dependent upon the properties that are desired of the final glass. If high chemical durability is desired, the frit additives are usually high in silica. Conversely, if a low melting glass is desired, the frit would be lower in silica and higher in boron oxide, zinc oxide, lead oxide, or sodium oxide. Satisfactory results have been achieved by using the zinc borosilicate glasses for retention of high-level radioactive waste. The glass may be formed and added to the canister in a molten state or, if desired, the waste calcine and pieces of glass such as frit may be placed in a canister and then melted together. The concept of melting the high-level waste calcine and glass frit in the container has several advantages in that in-can melting reduces the number of processes and the pieces of equipment required to vitrify the high-level waste, since the entire operation of filling, melting, and annealing can be accomplished in a single furnace. The in-can melting system also permits the vitrification of borosilicate and other glasses with higher waste loadings at lower process temperatures because the attainment of a low viscosity sufficient for the melt to drain from a separate melting mechanism is not necessary.

The fabrication of the metal billet 18 can be achieved in a separate location and then placed in the canister prior to the addition of the glass frit or the molten glass.

The canister itself is preferably formed of a stainless steel such as 304 or 304L with a wall thickness in the range of about 0.3 to 1.0 inch and a diameter in the range of about 10–14 inches. The top end cap 14 is placed on the shell 12 after the addition of the waste is completed. The end cap 14 may be welded to the shell to provide the necessary seal.

In filling the radial volume between the solid metal cylinder 18 and the shell with the glass, the latter fills the annulus 20 to a location spaced from the upper end of the billet 18. This volume between the top end cap 14 and the glass 22 remains empty because of the mechanical limitations and control uncertainties of the filling equipment. This volume should be as small as practicable while assuring that the canister is not over-filled.

Figure 2:
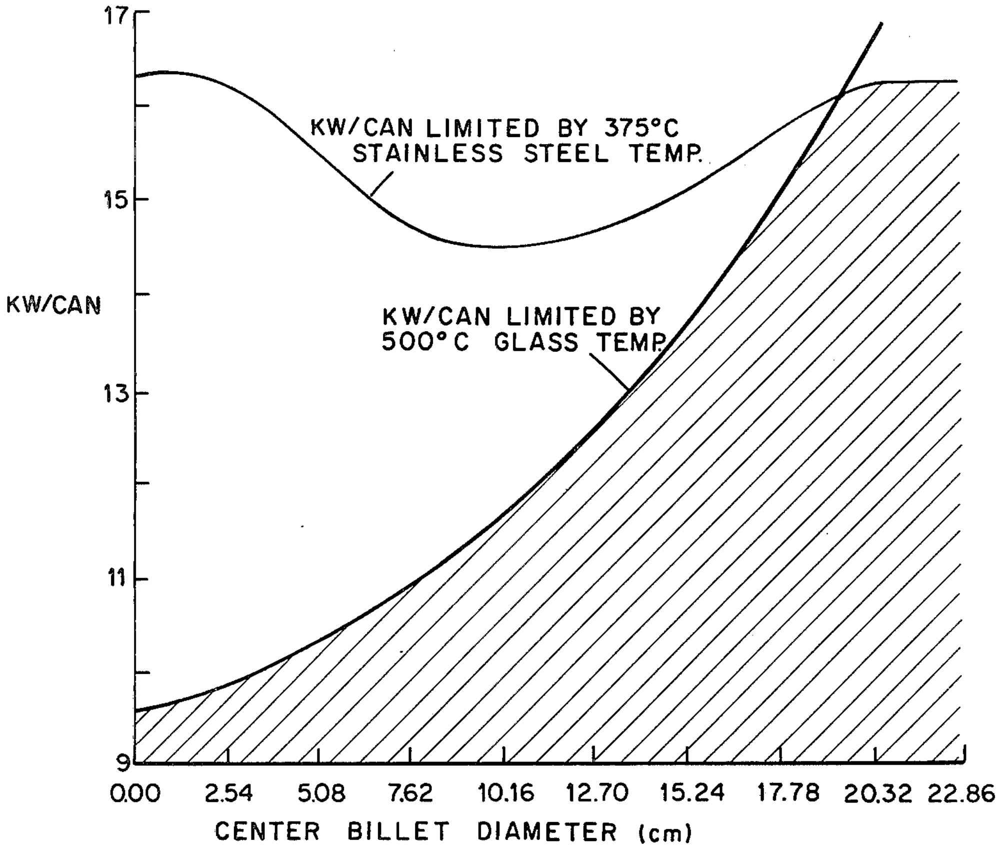
FIG. 2 is a graph illustrating total canister heat with metallic billets of various diameters.

A principal advantage achieved by utilizing the canister arrangement of the present invention is that high-level waste containing 70% greater heat output than previously confinable in storage canisters at the time of filling can be used in the canister arrangement of the present invention and still meet total heat per canister limit at the time of shipment to a suitable canister repository. This unique characteristic is due to the annular geometry of the glass which affords a much shorter thermal path for internally generated heat to be dissipated at the canister surface. The elevated canister surface temperature, which is still below acceptable limits, transfers heat to its surroundings much more efficiently. As best shown in FIG. 2, billet diameters in the range of about 4–10 inches can be utilized to maximize the total canister heat content within the temperature limits permissible with the particular waste glass and stainless steel canister. As will be apparent from FIG. 2, as the billet diameter increases the greater the heat the content (in kilowatts) that can be tolerated in the canister containing vitrified waste over that of a similar waste-containing canister without a centrally disposed billet. The shaded area in FIG. 2 indicates acceptable waste canister heat loadings with billet diameters utilized in accordance with the present invention.

A demonstration of advantages of the present invention is achieved by an experiment where scaled canisters of 5-inch diameter Schedule 40 Type 304 stainless steel were provided with only melted glass frit and with melted glass frit and metal billets. Centrally located billets of 304 stainless steel with 1.0, 1.5 and 2-inch diameters were employed in the 5-inch diameter canisters having billets. These model canisters are believed to accurately simulate the proposed hot-cell processing operation including operations with canisters of infinitely long configurations. These simulations were performed by adding room-temperature glass frit to preheated canisters assemblies at a temperature of about 1900° F. and recording the heating rates of the glass and canister by employing axially disposed parallel thermocouples. The parameters afforded by these experiments were utilized to numerically calculate the radial heating rates in the canisters with the three aforementioned sizes of centrally located billets. These same thermal properties and boundary conditions were used to extrapolate the heating profiles to a more practical 12-inch diameter canister. Extrapolated simulations of the scaled canisters with no billet and with billets of 3, 4.56 and 8-inch diameters were made. It required 5.5 hours for the coldest region of the all-glass (no central billet) to reach 1600° F. while the canister with a central billet of 8-inches diameter reached this 1600° F. temperature in only 29 minutes. This heating rate was achieved due to the smaller volume of glass and by the heat energy stored in the billet as well as the flow from the canister wall. Because of the large heat flow from the billet, the calculated results for the larger billet sizes should be insensitive to the boundary conditions at the canister surface and correct for most types of furnaces external to the canister. The short melting times achieved by utilizing the present invention are advantageous in minimizing fission product volatilization and glass phase separation in the furnace area as well as extending the furnace lifetime.

Figure 3:
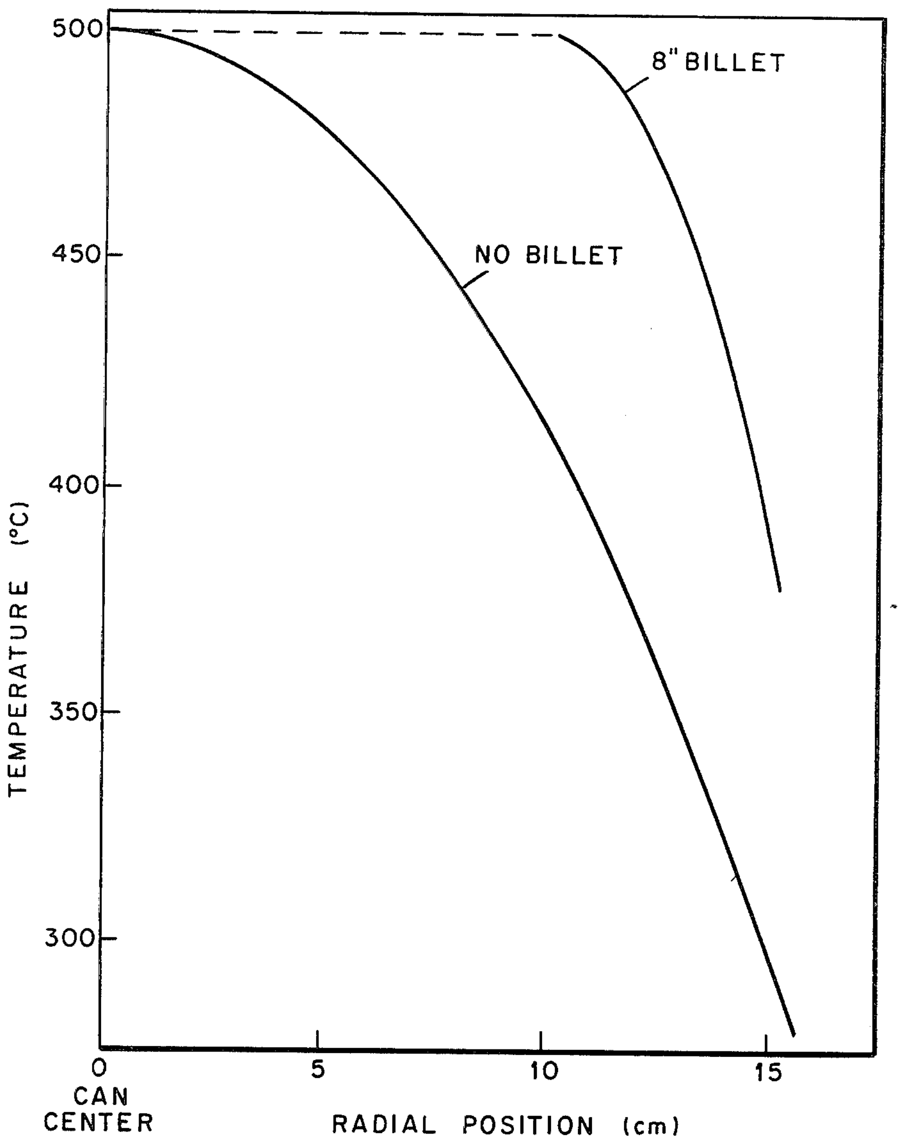
FIG. 3 is a graph plotting the radial temperature profile in a canister and the improvement achieved by the present invention.
Figure 4:
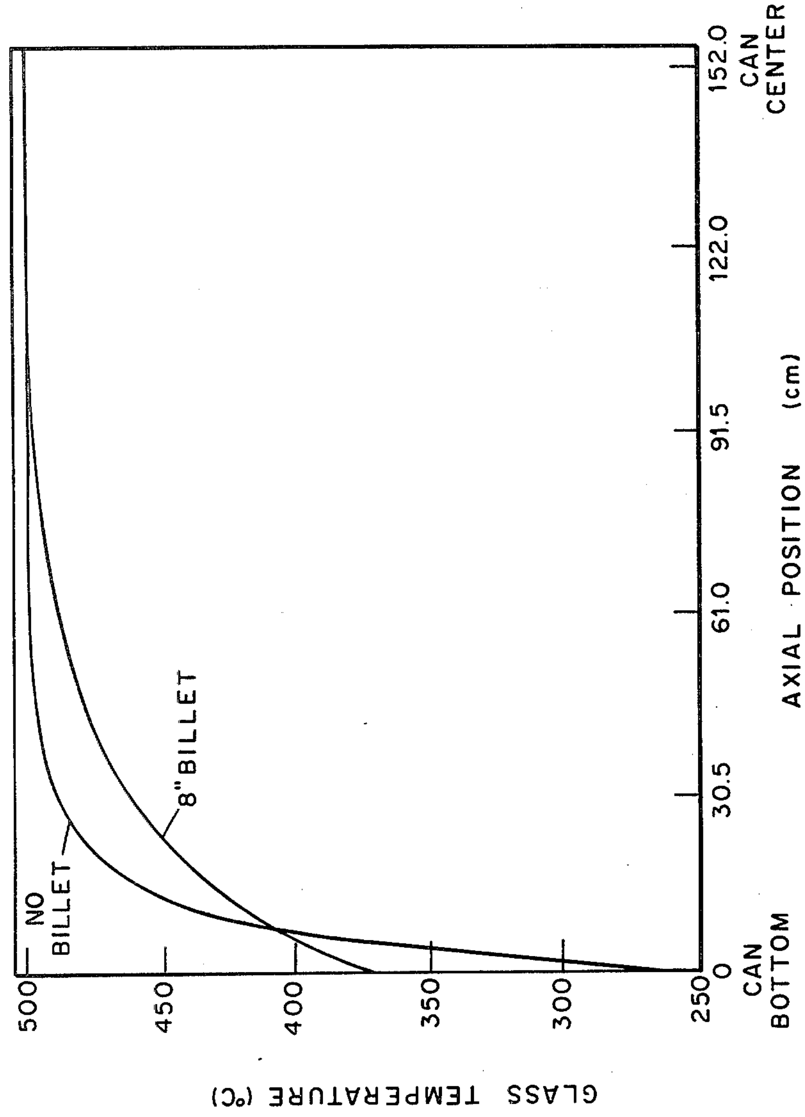
FIG. 4 is a graph plotting the axial or longitudinal temperature profile of a canister illustrating the improvement achieved by the present invention.

The effects the central metal billet has upon the temperature profiles throughout the canister after cooling a metal billet made from reprocessed fuel element cladding for 3 years are shown in FIGS. 3 and 4. The calculations used for generating this data illustrate plots for the temperature distribution in the radial direction and in the longitudinal direction of subject canister arrangements, respectively. As indicated by these data, the 8-inch diameter metal waste billet 18 significantly reduces the axial temperature gradients and the radial temperature differences so as to substantially reduce cracking and stresses in the vitreous waste. Further, the annular distribution of the high-level vitreous waste in the canister greatly increases the efficiency of in-can melting of the glass frit and calcine.

It will be seen that the present invention provides a highly economical system for the safe storage of both metallic radioactive waste and vitrified chemical waste in a single canister. Also, the improved heat transfer achieved by using the metal billet provides for the earlier vitrification and storage of high level waste than could be previously achieved when the maximum allowable calcine proportion (25% by weight) was included in the glass.

What is claimed is:

1. A canister arrangement for jointly storing radioactive heat-producing metallic and chemical waste, comprising a cylindrical shell, closure means at opposite ends of said shell for closing the latter, a solid cylinder of radioactive waste metal disposed in said shell in coaxial relationship with the longitudinal axis thereof, the waste metal cylinder being longitudinally spaced from said closure means and radially inwardly spaced from said shell to define an annulus therebetween, and an annular solid body of vitreous material and chemical waste disposed in said annulus in contacting relationship with said shell and said waste metal cylinder.

2. The canister arrangement claimed in claim 1, wherein said shell is vertically oriented, wherein one of said end closure means is a bottom end cap, and wherein thermal insulating means are disposed between said end cap and the lowermost end of said waste metal cylinder.

3. The canister arrangement claimed in claim 2, wherein said thermal insulating means consists of a wafer of refractory ceramic.

4. The canister arrangement claimed in claim 2, wherein the uppermost level of said solid body of vitreous material and chemical waste terminates at a location below the upper end of the waste metal cylinder.

5. The canister arrangement claimed in claim 2, wherein said shell is of stainless steel having a wall thickness in the range of 0.3 to 1.0 inch and a diameter in the range of about 10 to 14 inches, and wherein the waste metal cylinder is of a diameter in the range of about 4 to 10 inches.

* * * * *